T. A. HOOVER.
BUMPER FOR VEHICLES.
APPLICATION FILED JAN. 24, 1912.
1,191,306.
Patented July 18, 1916.
2 SHEETS—SHEET 1.
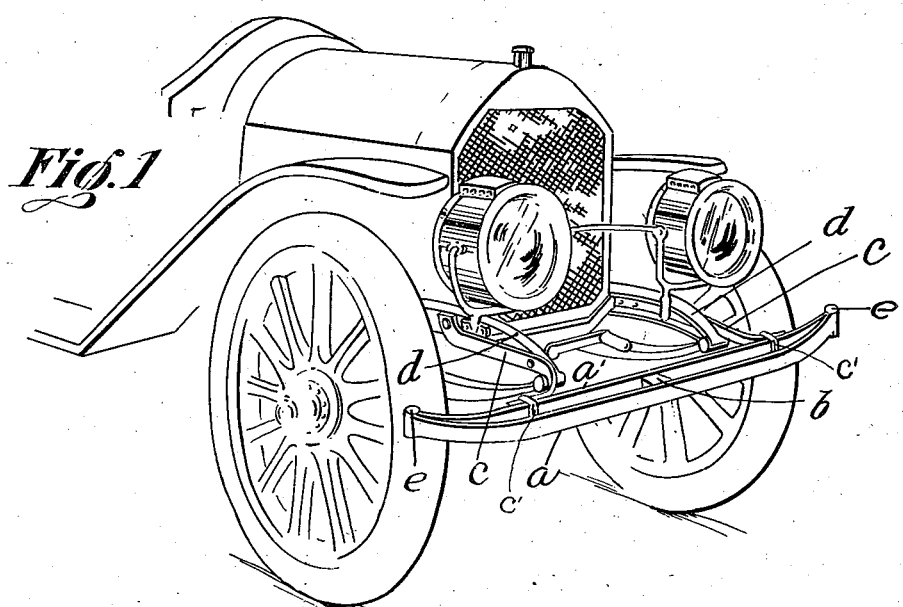
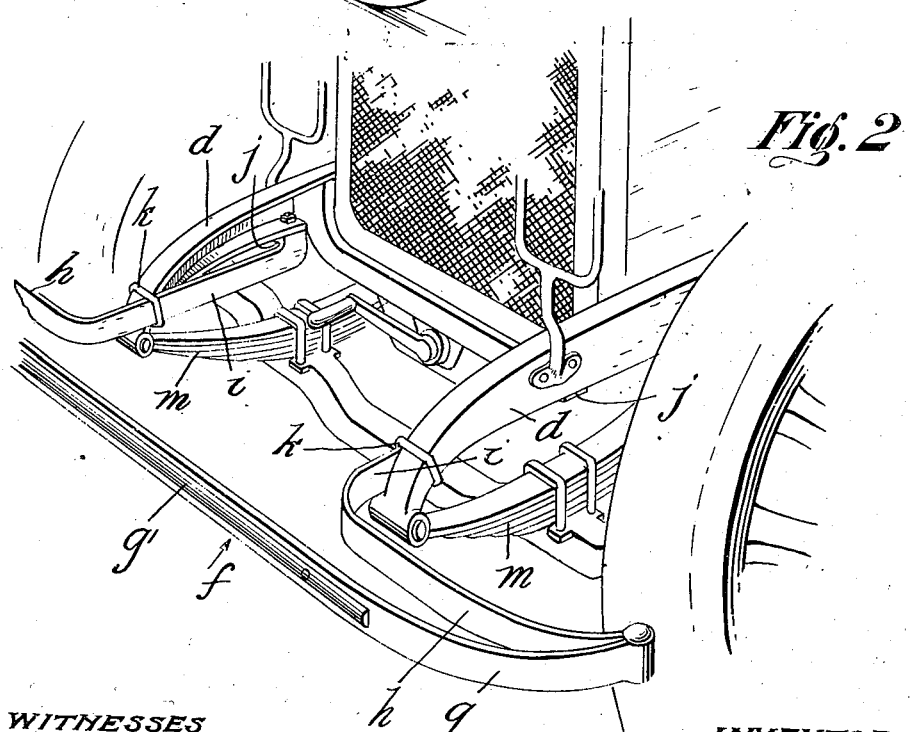
WITNESSES
INVENTOR
T. A. HOOVER
by James Hamilton
ATTORNEY

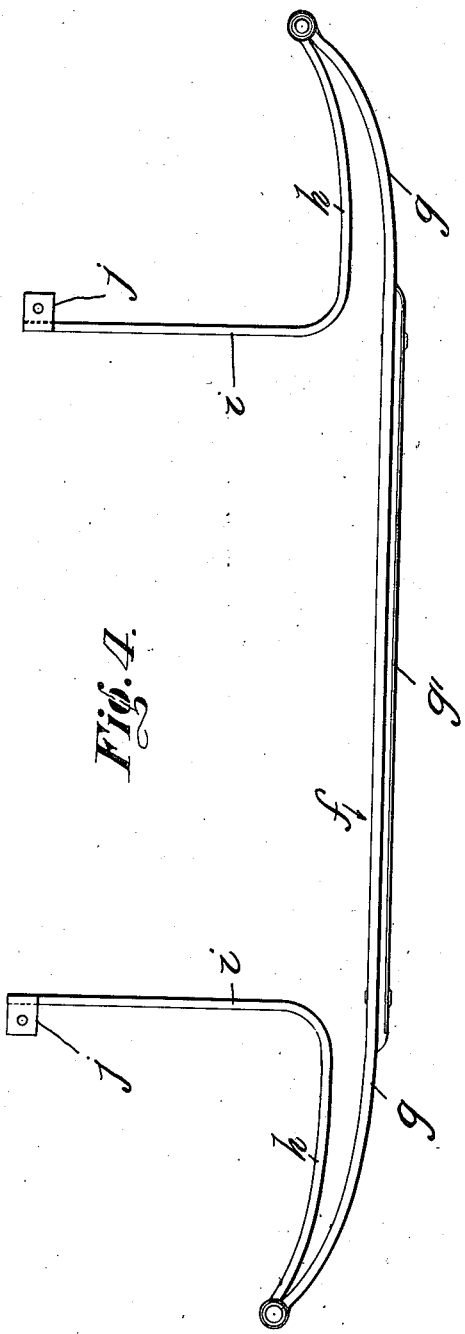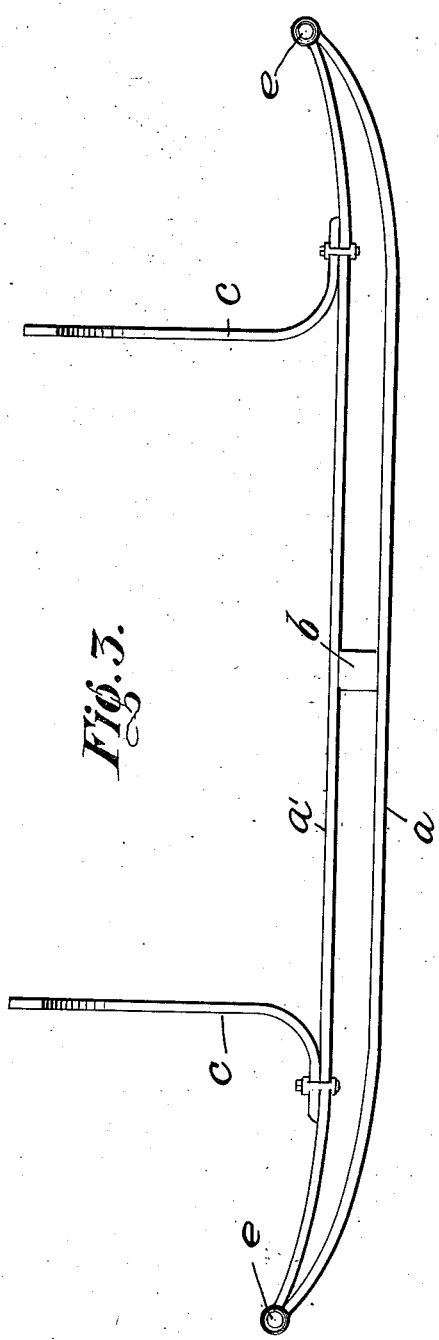

UNITED STATES PATENT OFFICE.

THOMAS A. HOOVER, OF FRESNO, CALIFORNIA.

BUMPER FOR VEHICLES.

1,191,306.  Specification of Letters Patent. Patented July 18, 1916.

Application filed January 24, 1912. Serial No. 673,140.

*To all whom it may concern:*

Be it known that I, THOMAS A. HOOVER, a citizen of the United States, residing at Fresno, in the county of Fresno and State of California, have invented certain new and useful Improvements in Bumpers for Vehicles, of which the following is a specification, reference being had to the accompanying drawings.

This invention relates to improvements in bumpers for vehicles and particularly to bumpers used upon self-propelled vehicles, such as automobiles; and an object of this invention is to provide an automobile bumper which will be simple in construction, comparatively cheap in manufacture, efficient and durable in use and susceptible of ready repair in case it is broken or otherwise injured.

Another object of this invention is to provide a bumper of the character described which will not rattle and which will be susceptible of easy adjustment and which may be readily connected with the proper parts of the automobile, such as the frame-members or chassis.

A third object of this invention is the provision of a bumper which will yield in all directions and which will absorb the shock of impact upon striking an obstacle.

Other features of this invention will be pointed out in the description and claims which follow.

In the drawings illustrating the principle of this invention and the best mode now known to me of applying that principle, Figure 1 is a perspective view of the front portion of an automobile equipped with my new bumper; Fig. 2 is a similar view in which is shown a modified form of my new bumper; Fig. 3 is a detail showing in plan the form of bumper illustrated in Fig. 1; and Fig. 4 is a detail illustrating in plan the form of bumper shown in Fig. 2.

In the form illustrated in Figs. 1 and 3, the front portion of the bumper is in a single piece bent to form an elongated loop the front and rear sides, respectively, of which are the spring-steel bars $a$, $a'$ centrally disposed between which is a separator-block $b$. To the rear bar $a'$ is suitably secured, as by clips $c'$, a pair of rearwardly-extending arms $c$ by means of which the bumper is fastened to the angle-irons $d$ forming a part of the frame or chassis of the vehicle (Fig. 1). At the ends of the integral bars $a$, $a'$ are formed eyes lined with bushings and containing double-head pins or rivets $e$ the heads of which are of such size and shape as to cover the upper and lower faces of the turned ends.

In the form shown in Figs. 2 and 4, my new bumper consists of a single piece of spring metal $f$ having a front or body portion $g$ in the form of a bar slightly curved at its ends, which are bent around the rivets or pins $e$ and from which extend parallel to the bar the branches $h$, integral with which are formed the rearwardly-extending arms $i$ having suitable ear-plates $j$. The arms $i$ pass through clips $k$ mounted upon the angle-irons $d$, which form a part of the frame of the vehicle and to the front ends of which are fastened the front ends of the vehicle springs $m$. By means of the ear-pieces $j$, the arms $i$ are secured to the lower flanges of the angle-irons $d$. The body portion $g$ of the spring $f$ is reinforced by means of the strip $g'$, which may, if desired, be made integral with the body portion in the form of a rib.

My new bumper being made of spring steel throughout, it will yield readily to forces exerted upon it in any direction; and, if from any cause, it becomes bent or broken, it may be readily repaired, which is not the case with the square, tubular and channel bumpers now common in use. My new bumper is attractive in appearance.

I claim:

1. In a fender, the combination with a vehicle frame, of a continuous spring arranged transversely in front of the frame, the ends of the spring being bent upon itself to the rear and inwardly, the bends in said spring forming the ends of the fender, and means secured to the frame and to the said ends of the spring at a distance from the said bends and in rear of the main portion of the spring whereby the spring is supported.

2. An automobile bumper consisting of a single continuous strip of spring metal the body portion of which is substantially convex outwardly and sufficiently wide to span substantially the front end of the automobile and the end-portions of which are curved first rearwardly and then extend inwardly; and a pair of arms which project rearwardly from said inwardly-extending end-portions and which are spaced apart a distance sufficient to engage the side members of the automobile frame and are formed with means for attachment thereto.

3. A bumper for vehicles comprising a continuous spring buffer bar for extension transversely of the vehicle, said bar having integral spring-supporting members, the said supporting members constituting a continuation of the body member and being extended laterally therefrom, and then rearwardly.

4. A bumper for vehicles comprising a continuous spring buffer bar for extension transversely of the vehicle, said bar being bent inwardly upon itself adjacent each end thereof and then rearwardly to form spring supporting members, and strengthening means for each of said first mentioned bends.

5. A bumper for vehicles comprising a continuous spring buffer bar for extension transversely of the vehicle, said bar being bent inwardly upon itself adjacent each end thereof, and then rearwardly to form spring supporting members, and means for strengthening each of said first mentioned bends, said means comprising a pin within and conforming to said bends.

6. A bumper for vehicles comprising a spring buffer bar for extension transversely of the vehicle, said bar being of continuous spring material throughout the entire length thereof, the ends of the bar being bent first upon itself to the rear and then inwardly to form integral spring supporting members, the bends in said bar forming the ends of the bumper.

Signed at the city and county of San Francisco, State of California, this 30th day of December, 1911.

THOMAS A. HOOVER.

Witnesses:
E. DOWNING,
B. WILSON.